3,174,187
MOLDING APPARATUS
Ferdinand Schriever, Unter den Hofen 27, Lerbeck, Porta, Germany
Filed Dec. 19, 1961, Ser. No. 160,558
Claims priority, application Germany, Feb. 28, 1961, D 35,527
5 Claims. (Cl. 18—30)

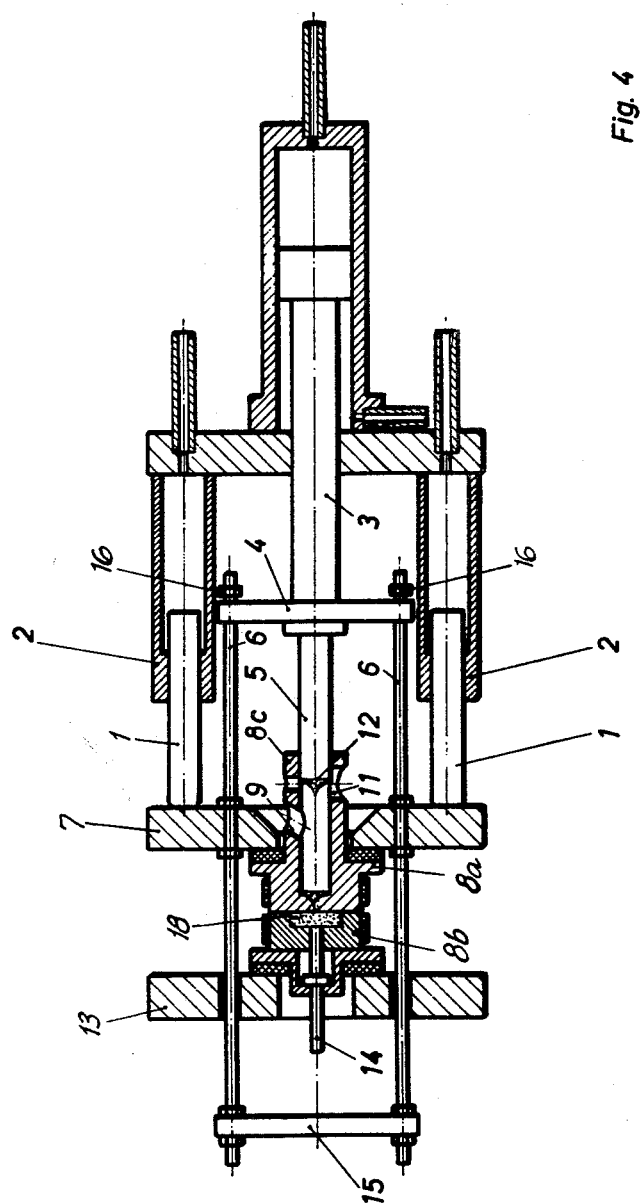

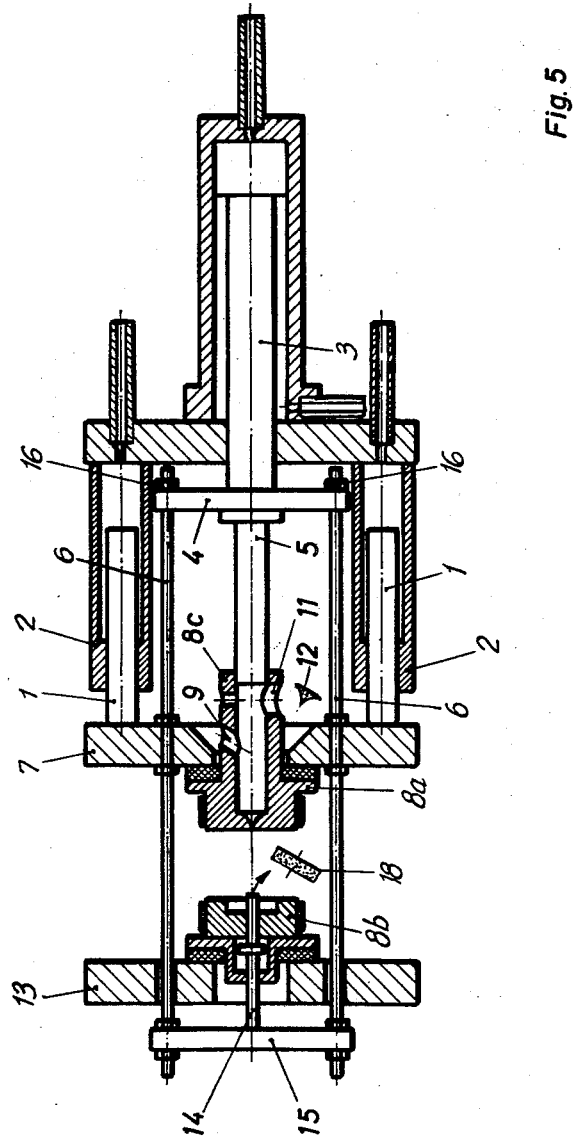

This invention relates to injection molding apparatus and, more particularly, to a machine for automatic injection molding of thermosetting or thermoplastic molding materials.

Injection molding is an inexpensive process for molding hardenable molding materials under pressure. Heretofore, molding presses have been arranged for vertical or for horizontal direction of movement. The closing motion of the press is usually opposite to that of the injection ram. According to one method, the closing movement of the press operates through a system of levers to move the injection ram in the opposite direction. This arrangement is unsatisfactory, since it is only semiautomatic and requires partially manual operation.

Other molding processes are also known which may be operated automatically, but the molding material is fed into an unheated cylinder and then injected into the mold cavities. This method is unsatisfactory, since high pressures will be necessary to close the mold and there will be a relatively long period of time required to heat the molding material. This particular process is not adapted to the use of preheated molding materials.

In view of the relatively slow processes of injection molding heretofore employed, it is an object of this invention to provide an apparatus which will perform the individual steps in the injection molding process automatically.

It is a further object of this invention to provide a molding apparatus in which a minimum of heat is lost by preheated molding materials.

In accordance with a preferred embodiment of this invention, preheated molding material is introduced into an injection cylinder which is part of one of the platens of the injection molding press. After an initial compression and plasticization, the molding materials are injected into the mold by an injection ram. When the plastic has hardened, the flash remaining within the injection cylinder is separated from the molded part by the retraction of the injection ram and is ejected from the injection cylinder. Subsequently, the mold is opened and the molded part is removed by means of an ejector.

A plate in which one of the platens of the press and ejection cylinder is secured is provided with two pistons which maintain the mold closed until the plastic in the mold has cured so that during the return movement of the injection ram, the flash is torn off. A plurality of rods are also secured to the plate. The rods extend through a guide plate mounted on the ram. At one end of each rod stops have been provided which are engaged by the guide plate during the return movement of the injection ram so that the mold platens will be separated after the ram is fully retracted.

An ejector is provided in the opposite platen of the press. The ejector is operated during the return movement of the injection ram by a cross arm which is secured to the ends of the rods.

Plastic molding material is dispensed in pulverized or granulated form. It is preheated in a heating apparatus until just before it reaches the sintering temperature. As an alternative, the molding material can be fed in premolded tablets. In that case, preheating would preferably be accomplished through infrared or high frequency rays. The introduction of preheated molding material into the hot injection cylinder causes quick plasticization and therefore, very short delay time is necessary before the material is injected into the mold.

This preferred embodiment of the invention is illustrated in the accompanying drawings, in which:

FIGURE 4 is a cross sectional view of the apparatus after the injection ram has been retracted and the flash is torn from the molded part; and FIGURE 5 is a cross sectional view of the apparatus with the press open and the molded part and flash being discharged from the apparatus.

Figure 1:
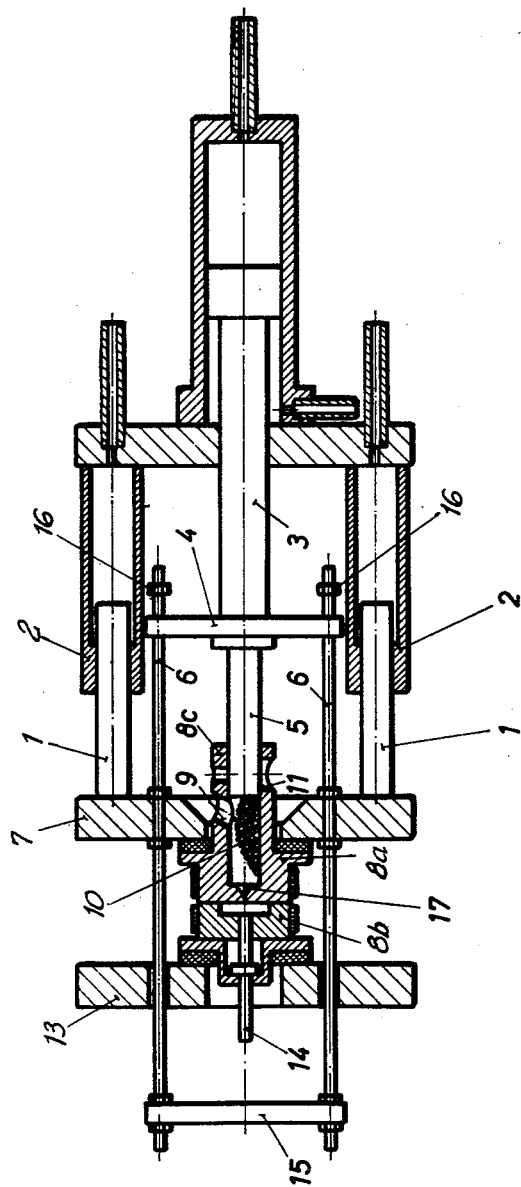
FIGURE 1 is a cross sectional view of the apparatus of this invention during the filling of the compression cylinder with molding material.

Referring to FIGURE 1, auxiliary pistons 1 are slidingly mounted within corresponding pneumatic or hydraulic cylinders 2. A main piston 3 is provided with a piston guide plate 4 to which is secured an injection ram 5. The guide plate 4 is provided with holes at its edges to accommodate rods 6. A tool reception plate 7 is secured to the ends of the auxiliary pistons 1 and the rods 6 are secured to the plate 7. One of the platens 8a of the injection press is secured to the tool guide plate 7. The platen 8a extends through the plate 7 and an injection cylinder 8c is formed integral with the platen 8a.

A bore hole 9 is provided in the injection cylinder 8c through which the molding material 10 is supplied to the injection cylinder. An exhaust bore hole 11 is also provided through the wall of the injection cylinder 8c for the ejection of the flash 12, as will be subsequently explained.

The cooperating platen 8b of the injection molding press is secured to a plate 13. An ejector pin 14 is mounted within the platen 8b. The ejector pin is operated by a cross arm 15 which is secured between the rods 6. At the opposite end of the rods 6, stops 16 are provided, which are engaged by the guide plate 4 to open the molding press when the main piston 3 and injection ram 5 are retracted.

A nozzle shaped channel 17 is provided in the platen 8a of the injection molding press.

In operation, the injection molding press platens 8a and 8b are closed by means of the auxiliary pistons 1. Fluid under intermediate pressure is supplied to the cylinders 2. After the injection molding tool platens 8a and 8b are closed, the main piston 3 and the injection ram 5 are actuated to advance the ram into the injection cylinder 8c. The injection ram 5 continues to advance until it reaches the trailing edge of the bore 9. Subsequently, the molding material 10, which has already been preheated, is inserted into the injection cylinder 8c.

Figure 2:
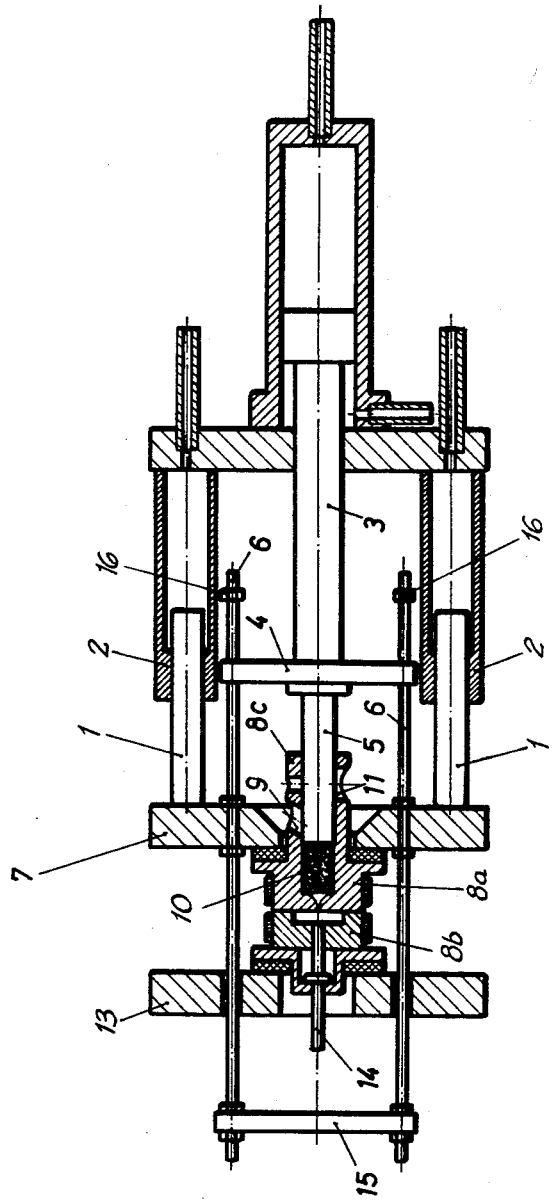
FIGURE 2 is a cross sectional view of the apparatus during the compression of the molding material.
Figure 3:
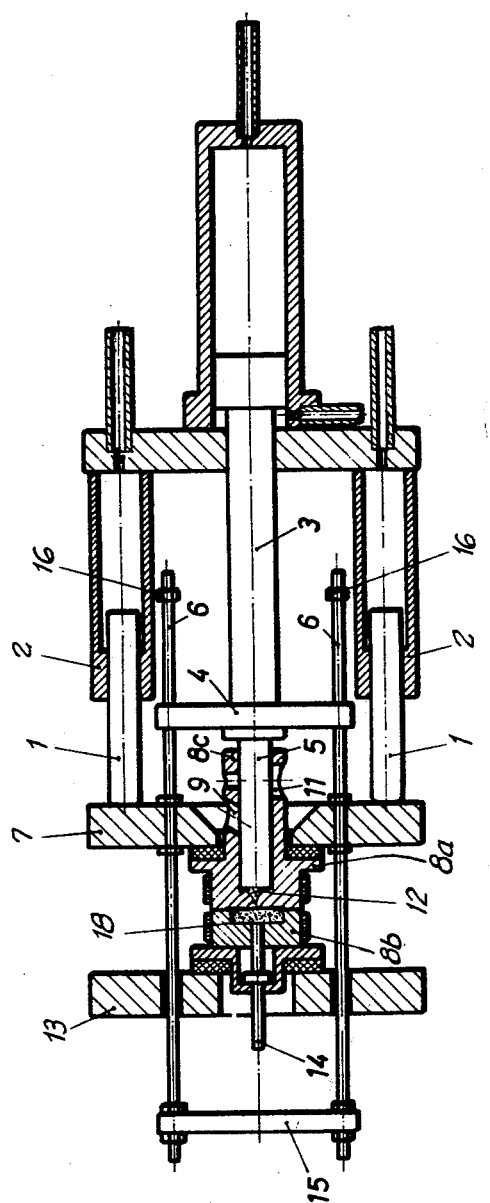
FIGURE 3 is a cross sectional view of the apparatus after the molding material has been injected into the mold.

The injection ram 5 continues to advance into the injection cylinder 8c and compresses the molding material 10, as shown in FIGURE 2. Due to the pressure which is developed from the compression, the molding material becomes plastic under heating. High pressure fluid is then admitted to the cylinders of the pistons 1 and 3 and the injection processes begun. The closing movement of both the injection molding press and the injection ram operate in the same direction on one side of the press. Accordingly, the force acting to close the press is equal to the sum of the forces of the auxiliary pistons 1 and the main piston 3. The injection process continues until the mold cavities between the platens 8a and 8b have been filled and a small surplus of molding material remains in the nozzle shaped channel 17 in front of the piston 5 to form a flash 12, as shown in FIGURE 3.

The face of the ram 5 is provided with suitable means, such as grooves, to cause the plastic molding material to adhere to the face of the ram during the return stroke of the ram 5.

When the plastic has hardened, the flash 12 is torn off at its thinnest point from the molded article 18 by the return movement of the injection ram 5. As shown in FIGURE 4, the injection press platens 8a and 8b remain closed under the force of the auxiliary pistons 1.

During the retraction of the main piston 3 and the injection ram 5, the piston guide plate 4 engages the stops 16 on the rods 6. The pressure in the cylinders 2 is relieved and, since the rods 6 are secured to the plates 7, retraction of the guide plate 4 causes the platens of the injection press to open.

As the tool receiving plate 7 moves to open the press, the rods 6 which are secured to the plate 7, also move and the cross arm 15 is moved to the right, as viewed in FIGURE 5. The cross arm 15 displaces the ejector pin 14 sufficiently to engage the molded part 18 and eject it from the press. When the ram 5 reaches its rearward position the flash 12 is dislodged from the face of the ram 5 by a conventional ejector mechanism or other suitable means and the flash 12 drops out through the bore hole 11 which has been provided in the injection cylinder 8c. After the molded article 18 has passed a discharge safety mechanism, it actuates an impulse for the commencement of the next operating cycle.

The course of each operation may be controlled through an adjustable time-movement schedule and all of the courses of movement and speed can be regulated hydraulically. It is also possible to operate at different injection pressures, which can be changed hydraulically, or by changing the injection cylinder and its corresponding injection ram.

In this embodiment of the invention, the principal parts of the apparatus move in a horizontal direction. It would also be possible to operate vertically, particularly when inserts or cores are to be placed in the mold before the mold is closed.

After transformation of the corresponding cycle control, the injection molding of hardenable molding materials according to the method of this invention can also be accomplished with conventional injection machines by using a separate drive for the closing pressure of the tool and for the injection pressure of the ram. The injection cylinder and the injection ram, however, must be changed and a suitable ejection arrangement must be provided for the flash.

I claim:

1. A molding press comprising a stationary platen, a movable platen, power means for moving the movable platen into abutting relation with the stationary platen to form a mold therebetween, said movable platen having a cylinder formed therein and a nozzle communicating between the cylinder and the mold surface of the platen, a ram mounted in the cylinder for reciprocating movement and motor means for moving the ram relative to the cylinder whereby the power means and the motor means maintain the platens in abutting relation during the injection of molding material from the cylinder into the mold, said movable platen having a radial supply bore communicating with said cylinder for feeding molding material to the cylinder and having a radial ejection port extending through opposite sides of the cylinder and communicating with the cylinder for ejecting flash, said ejection port being spaced from the nozzle a greater distance than the supply bore.

2. A molding press comprising a stationary platen, a movable platen, a single acting fluid power motor connected to the movable platen in position for moving the movable platen into abutting relation with the stationary platen to form a mold therebetween, said movable platen having a cylinder formed therein and a nozzle communicating between the cylinder and surface of the platen, said movable platen having a radial supply bore communicating with said cylinder for feeding molding material to the cylinder and having a radial ejection port extending through opposite sides of the cylinder and communicating with the cylinder for ejecting flash, said ejection port being spaced from the nozzle a greater distance than the supply bore, a ram mounted in the cylinder for reciprocating movement, and a double acting fluid power motor connected to the ram for moving the ram relative to the cylinder whereby the fluid power motors maintain the platens in abutting relation during injection of molding material from the cylinder into the mold.

3. A horizontal molding press comprising a stationary platen, a movable platen, power means for moving the movable platen into abutting relation with the stationary platen to form a mold therebetween, said movable platen having a cylinder formed therein and a nozzle communicating between the cylinder and the surface of the platen, a double acting fluid power motor having a piston, a ram connected to the piston and extending into the cylinder, said movable platen having a radial bore communicating with said cylinder for feeding molding material to the cylinder and having a radial port communicating with the cylinder for ejecting flash, said ram and said platen being movable substantially horizontally, retracting means on the movable platen and means on the piston for engaging the retracting means whereby retracting movement of the piston moves the movable platen relative to the stationary platen to open the mold.

4. A horizontal molding press comprising a stationary platen, a movable platen, said stationary platen having a mold cavity therein, power means for moving the movable platen into abutting relation with the stationary platen to form a mold therebetween, said movable platen having a cylinder formed therein and extending substantially horizontally and having a nozzle communicating between the cylinder and the surface of the platen, a double acting fluid motor having a piston, a ram connected to the piston and extending into the cylinder, said movable platen having a radial bore communicating with said cylinder for feeding molding material to the cylinder and having a radial port communicating with the cylinder for ejecting flash, said port sloping upwardly away from said nozzle, said bore extending downwardly and being spaced from the nozzle a greater distance than the port, rods secured to the movable platen and having shoulders thereon, means on the piston for engaging the shoulders after retracting movement of the piston is begun, an ejector pin in the stationary platen in position for axial movement in the direction of retracting movement of the piston, said pin extending into the mold cavity, said rods extending on opposite sides of the movable platen and to the side of the stationary platen opposite the mold cavity, and means on the rods for engaging the pin to dislodge molded material from the cavity, said rods having such a length that the engaging means contacts the pin after the mold is opened.

5. A horizontal molding press comprising a stationary platen, a movable platen, said stationary platen having a mold cavity therein, power means for moving the movable platen into abutting relation with the stationary platen to form a mold therebetween, said movable platen having a cylinder formed therein and extending substantially horizontally and having a nozzle communicating between the cylinder and the surface of the platen, a double acting fluid motor having a piston, a ram connected to the piston and extending into the cylinder, said movable platen having a radial supply bore communicating with said cylinder for feeding molding material to the cylinder and having a radial ejection port extending through opposite sides of the cylinder and communicating with the cylinder for ejecting flash, said ejection port being spaced from the nozzle a greater distance than the supply bore.

References Cited in the file of this patent

UNITED STATES PATENTS

| | | |
|---|---|---|
| 1,916,495 | Shaw | July 4, 1933 |
| 1,958,199 | Morin | May 8, 1934 |
| 2,408,911 | Burry | Oct. 8, 1946 |
| 2,465,204 | Dalton | Mar. 22, 1949 |
| 3,015,848 | Hollfritsch | Jan. 9, 1962 |